United States Patent
Piper et al.

[11] Patent Number: 6,085,815
[45] Date of Patent: *Jul. 11, 2000

[54] PRE-PRESSURIZED POLYURETHANE SKATE WHEEL

[75] Inventors: Neal Piper; Tom Peterson, both of Huntington Beach, Calif.

[73] Assignee: The Hyper Corporation, Santa Ana, Calif.

[*] Notice: This patent is subject to a terminal disclaimer.

[21] Appl. No.: 08/975,809

[22] Filed: Jul. 10, 1997

Related U.S. Application Data

[63] Continuation-in-part of application No. 08/680,728, Jul. 12, 1996, Pat. No. 5,908,519, which is a continuation-in-part of application No. 08/595,844, Feb. 2, 1996, Pat. No. 5,641,365, which is a continuation-in-part of application No. 08/502,828, Jul. 14, 1995, Pat. No. 5,632,829, which is a continuation-in-part of application No. 08/354,374, Dec. 12, 1994, Pat. No. 5,630,891.

[51] Int. Cl.$^7$ ..................................................... A63C 17/22
[52] U.S. Cl. ........................... 152/165; 152/327; 152/328; 152/333.1; 301/5.3
[58] Field of Search ..................................... 152/165, 7, 9, 152/166, 322–328, 320, 452, 302, 344.1, 345.1, 339.1, 333.1, 384, 501, 511, DIG. 18; 301/5.3, 35.51; 280/11.22, 11.23

[56] References Cited

U.S. PATENT DOCUMENTS

| | | |
|---|---|---|
| 988,533 | 4/1911 | Zverina . |
| 2,052,130 | 8/1936 | Cassady ................................. 152/165 |
| 2,324,974 | 7/1943 | Greenup ................................. 152/511 |
| 2,570,349 | 10/1951 | Kardhordo . |
| 2,677,906 | 5/1954 | Reed . |
| 2,871,061 | 1/1959 | Behm et al. . |
| 3,121,430 | 2/1964 | O'Reilly . |
| 3,389,922 | 6/1968 | Eastin . |
| 3,469,576 | 9/1969 | Smith et al. . |
| 3,666,322 | 5/1972 | Pickron . |
| 3,823,293 | 7/1974 | Gilliatt . |
| 3,877,710 | 4/1975 | Nyitrai . |
| 3,937,780 | 2/1976 | Mercier . |
| 4,031,937 | 6/1977 | Georgia et al. ......................... 152/323 |
| 4,040,670 | 8/1977 | Williams . |

(List continued on next page.)

FOREIGN PATENT DOCUMENTS

96/18513  6/1996  WIPO ..................................... 152/165

*Primary Examiner*—Geoffrey L. Knable
*Attorney, Agent, or Firm*—Fulwider Patton Lee & Utecher, LLP

[57] ABSTRACT

The present invention is a pre-pressurized in-line skate wheel which is capable of being pressurized at low levels and which further includes an integral bladder device having an annular tube and three bladder rods which are in fluid communication with respect to each other. The wheel is configured with a rigid polyurethane hub formed with a drop center and further having a pair of radially extending flanges with three pairs of axial openings. The hub is further formed with three radially projecting spokes. The tire body surrounds the bladder device and is constructed of a generally more resilient polyurethane which bonds to the hub, flanges and bladder. The method of manufacture utilizes blow molding techniques for the bladder device which includes a post vulcanization chlorine bath. The tire body is formed using liquid thermoset polyurethane poured into an open cast mold. The resulting wheel ensures the rider of a long lasting, light weight tire with exceptional shock absorption properties to therefore provide a smooth and comfortable ride.

34 Claims, 12 Drawing Sheets

U.S. PATENT DOCUMENTS

| | | |
|---|---|---|
| 4,071,279 | 1/1978 | Chung . |
| 4,183,156 | 1/1980 | Rudy . |
| 4,208,073 | 6/1980 | Hechinger . |
| 4,219,945 | 9/1980 | Rudy . |
| 4,305,212 | 12/1981 | Coomer . |
| 4,361,969 | 12/1982 | Vermonet . |
| 4,379,104 | 4/1983 | Koorevaar .............................. 264/45.5 |
| 4,445,283 | 5/1984 | Meyers . |
| 4,909,523 | 3/1990 | Olson . |
| 5,028,058 | 7/1991 | Olson . |
| 5,046,267 | 9/1991 | Kilgore et al. . |
| 5,048,848 | 9/1991 | Olson et al. . |
| 5,129,709 | 7/1992 | Klamer . |
| 5,158,767 | 10/1992 | Cohen et al. . |
| 5,253,435 | 10/1993 | Auger et al. . |
| 5,256,350 | 10/1993 | Frazini et al. . |
| 5,257,470 | 11/1993 | Auger et al. . |
| 5,297,349 | 3/1994 | Kilgore . |
| 5,310,250 | 5/1994 | Gonsior . |
| 5,312,844 | 5/1994 | Gonsior et al. . |
| 5,320,418 | 6/1994 | Chen . |
| 5,343,639 | 9/1994 | Kilgore et al. . |
| 5,346,231 | 9/1994 | Ho . |
| 5,351,710 | 10/1994 | Phillips . |
| 5,353,459 | 10/1994 | Potter et al. . |
| 5,353,523 | 10/1994 | Kilgore et al. . |
| 5,362,075 | 11/1994 | Szendel . |
| 5,401,037 | 3/1995 | O'Donnell et al. . |
| 5,406,661 | 4/1995 | Pekar . |
| 5,406,719 | 4/1995 | Potter . |
| 5,416,988 | 5/1995 | Potter et al. . |
| 5,425,184 | 6/1995 | Lyden et al. . |
| 5,441,286 | 8/1995 | Pozzobon . |
| 5,468,140 | 11/1995 | Hoffman et al. . |
| 5,560,685 | 10/1996 | DeBortoli . |
| 5,567,019 | 10/1996 | Raza et al. . |
| 5,853,225 | 12/1998 | Huang ...................................... 301/5.3 |

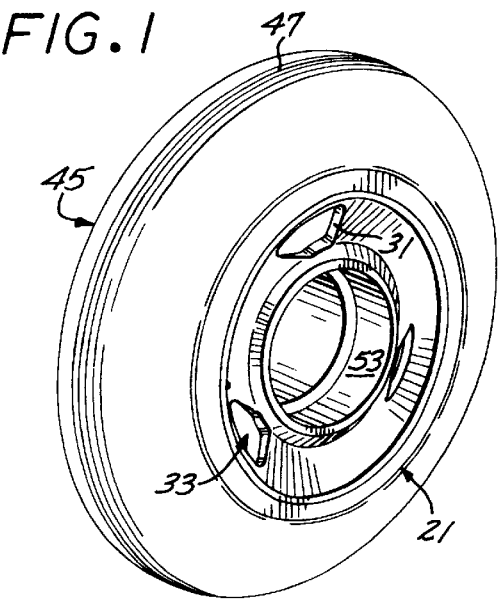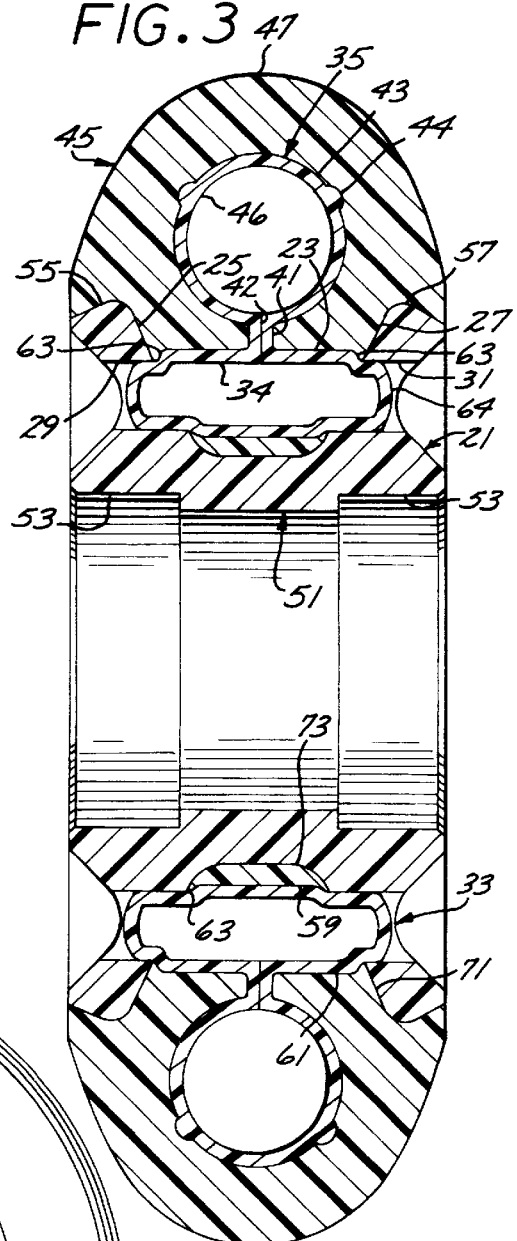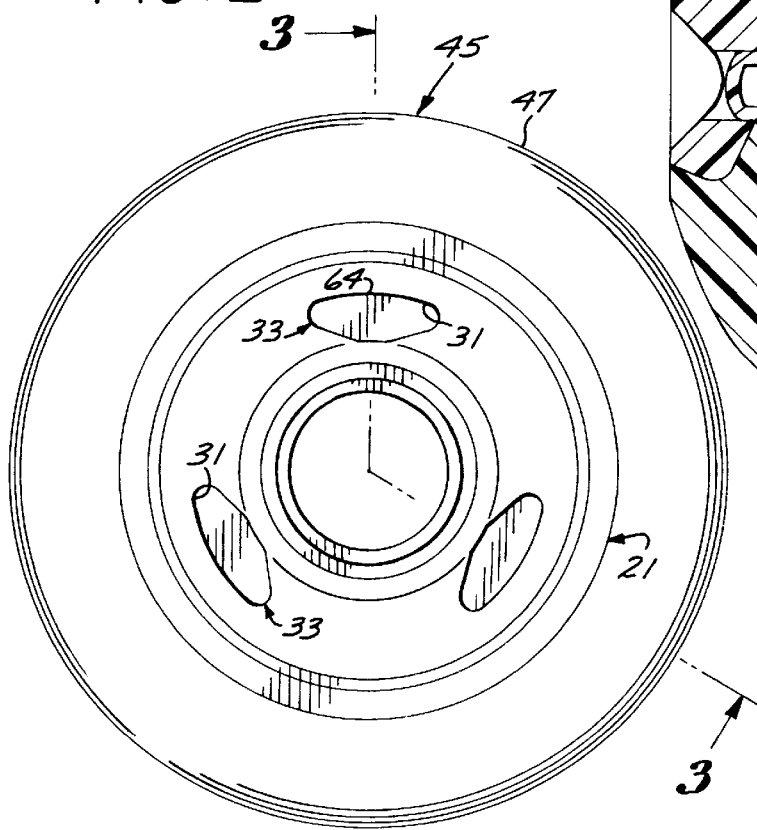

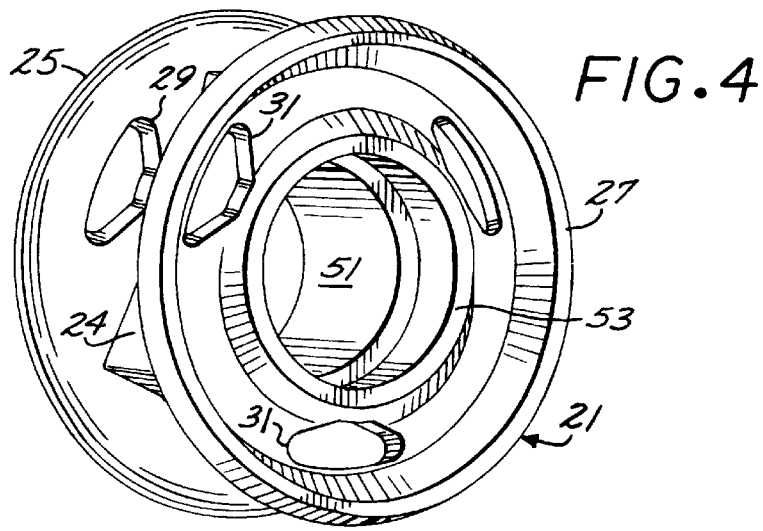
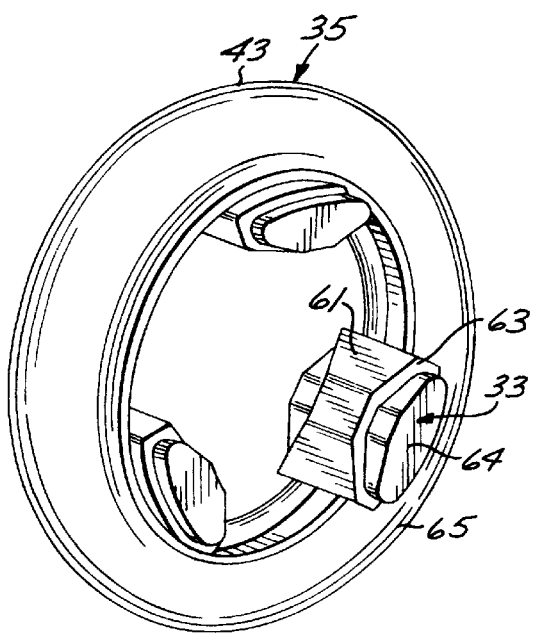
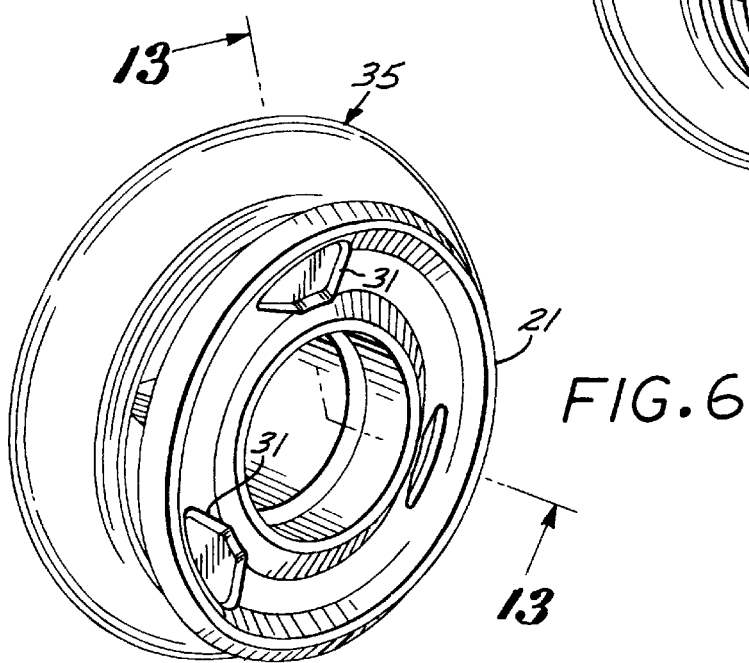

PRE-PRESSURIZED POLYURETHANE SKATE WHEEL

This application is a continuation-in-part of our U.S. application Ser. No. 08/680,728 filed Jul. 12, 1996, now U.S. Pat. No. 5,908,519 which was in turn a continuation-in-part of our U.S. application Ser. No. 08/595,844, filed Feb. 2, 1996, now U.S. Pat. No. 5,641,365 which was in turn a continuation-in-part of our U.S. application Ser. No. 08/502,828, filed Jul. 14, 1995, now U.S. Pat. No. 5,632,829 which was in turn a continuation-in-part of our U.S. application Ser. No. 08/354,374, filed Dec. 12, 1994, now U.S. Pat. No. 5,630,891.

BACKGROUND OF THE INVENTION

1. Field of the Invention

This invention relates to a skate wheel and more particularly to a pre-pressurized pneumatic in-line skate wheel of integral construction and having an internal integral bladder device comprising a tube and lobe structure in fluid communication and chamber structure in fluid communication.

2. Description of the Prior Art

In the recent past, roller skate design has developed into a growth industry. High technology performance wheels and skate designs have drastically altered the concepts and designs that have previously been in vogue. In turn, these design alterations have created a demand for enhanced performance and more technologically advanced skates for all types of users. No longer are recreational skaters content with a basic skate having basic wheels, today even those who are infrequent skaters find themselves expecting better performance, and lighter weight skates with more durable skate wheels. The present invention will satisfy these needs.

Roller skates have been known in the art for over a century. Early roller skates were designed in various forms, the most common of these included four wheels placed in a box-like configuration. This design made it easy for the skater to balance but did not afford the high level of precision and maneuverability desired by many skaters. Typically, most wheels used in early roller skates were manufactured from metal or wood. Such a wheel would facilitate movement but at the cost of comfort. In an attempt to improve the cushioning properties of the skate, while at the same time providing a resilient tire, it was proposed to design a partially pneumatic and partially solid tire comprised of multiple components with varying resiliencies. A wheel of this type was disclosed in U.S. Pat. No. 1,244,209 to Hickman. Such a wheel enhanced the skater comfort but could easily break down due to the multi-component structure.

Precision and maneuverability soon became to most desired traits for the recreational skater and it was thereafter proposed to mount the wheels in tandem along the length of the skate. In this way, the roller skater could enjoy the precision and performance normally associated with ice skates yet have the freedom and use available with outdoor skates. By creating a tandem roller skate, with "in-line" wheel placement, the user was able to make quick starts, sudden stops, and high speed turns. A device of this type was disclosed in U.S. Pat. No. 2,570,349 to Kardhordo. The wheels in Kardhordo were also made of rubber material to enhance the gripping properties and maneuverability.

This "in-line" skate style has become extremely popular for both recreational purposes and for the professional skater. The typical configuration of the modern in-line skate aligns four wheels, in tandem, along the length of the skate. Such an alignment allows the skater to travel with less friction and resistance, comparable to ice skating. When the recreational skater uses his in-line skates, he will typically traverse over a variety of surfaces. When skating over asphalt or concrete the skate may encounter gravel, loose rocks or cracks. It is thus important that the skate wheel be capable of absorbing shock and yet provide a smooth ride at a fast pace all without undue resistance to rolling under load.

Generally, modern skate wheels have been constructed using solid polyurethane mounted on a hub. Such wheels provide a relatively smooth ride but are limited in their ability to either provide wheels capable of high speeds, or which have enhanced shock absorption capabilities. A solid tire body is restricted in its ability to cushion and absorb shock associated with different loads applied to the tire when encountering irregular surfaces. Since a great portion of in-line skates are used in recreational skating involving various maneuvers over outdoor surfaces, it is important that they withstand numerous, different, side loads which result from inclinations of the skate as the rider travels over uneven ground, makes sharp turns, and jumps over small obstacles. Many skaters would like to have the option of skating one day at high speeds on relatively rigid wheels, and the next day on more resilient wheels which can accommodate relatively rough terrain. It is therefore apparent that the design of in-line skate wheels involves more and different factors than that involved in designing traditional roller skate wheels. As can be seen, the performance requirements for in-line skates are extremely high, even as dictated by the casual skater.

It is desirable that an in-line skate wheel be capable of withstanding numerous different loads, as well as being resilient to provide shock absorbent characteristics. This ability to absorb shock is most critical when traveling over rocks or other uneven surfaces. Failure of the wheel to provide for shock absorption may result in the rider incurring injury to his or her knees or legs as a result of constant vibration, or imposition of a sharp jolt. But, increased shock absorption in a solid urethane wheel, typically limits results in performance parameters important to high speed skating.

It was thereafter proposed to encapsulate an adjustable pneumatic tube within a polyurethane tire body and having a valve structure to adjust the pressure within the tube. Such a configuration enables the user to vary the performance requirement of the tire by adjusting the amount of air inside. Thus, a tire with more air will allow the rider to achieve high speeds since the tire is less resilient, while a tire with less air will be more resilient and more shock absorbent. Such a device was disclosed in U.S. Pat. No. 5,630,891 to Peterson, and the inventor of the present invention, and was assigned to the assignee of this application. However, such a wheel is expensive to manufacture and requires the user to physically adjust the tire depending on the changing surface characteristics.

It has been recently proposed to provide a pre-pressurized pneumatic in-line skate wheel having a tube and a plurality of bladders inside a polyurethane tire. This design combines the absorption afforded through a pneumatic tire while providing the resiliency and speed capabilities achievable through a harder polyurethane tire. I proposed such a construction in U.S. Pat. No. 5,461,365, assigned to the assignee of this application. Although such a structure generally achieves the desired objective, it is costly to manufacture and due to the discrete structure of the bladders the possibility of puncture and other damage to the bladder may easily render the wheel unusable, furthermore, such a structure required that the bladder be maintained at a high pressure.

In other areas of the art, such as in the construction of variable pressure athletic shoes, it has been known to provide elastomeric bladders configured with multiple discrete chamber, open cell elastomeric foam, having inlet and outlet valves. Devices of this type are shown in U.S. Pat. No. 4,287,250 to Rudy and U.S. Pat. No. 5,144,708 to Pekar. However, such bladders have not been generally adapted to, or employed in skate wheel construction.

Thus, there remains the need to provide an in-line skate wheel utilizing a low pressure polyurethane and pneumatic structure, which is configured in such a way as to provide shock absorption, high speed capabilities, and resiliency while maintaining a high degree of durability and still it be relatively inexpensive to manufacture. Thus, the rider may enjoy a comfortable and fast wheel which has a long life without forgoing any performance characteristics.

SUMMARY OF THE INVENTION

This invention is a pre-pressurized pneumatic in-line roller skate wheel which provides the skater with a smooth ride free from the effects of surface changes and capable of providing the best possible ride under a variety of conditions. The wheel construction of the present invention is more functional compared to other wheels on the market and can be manufactured utilizing an easier and more inexpensive process and thus is more cost effective. Furthermore, the structure of the wheel is more durable and is further designed to reduce problems associated with other currently available pneumatic wheels. Thus, the present invention will provide the rider with a more comfortable ride than is presently available with a non-pneumatic wheel, but without the costs normally associated with high performance pneumatic skate wheels.

The wheel includes a relatively hard urethane hub formed with a drop center and further having a pair of radially projecting flanges, the drop center is further defined by three spokes which project radially from the hub. The flanges are further formed with three equally spaced axial openings which define windows therethrough. Surrounding the hub drop center is a bladder device which is comprised of an annular tube which is pre-pressurized at low pressure with fluid. Nested between the tube and against the drop center are three equally spaced axially projecting air chambers, or rods, which are integral with the tube and which allow for fluid communication therebetween. The respective axial ends of the rods may be nested in the windows of the flanges so that the bladder rods may be viewed from the side. Encapsulating the hub and substantially surrounding the bladder device is a thermoset polyurethane tire body. The tire body is formed by a load bearing wall projecting radially outwardly from between the flanges, to form an arcuate tread surface.

The combination of the pre-pressurized tube and bladder rods function together to cushion the tire and give the user consistent performance characteristics, as well as supporting the tire and flanges. Because the bladder device allows for free movement of gas between the tube and the rods, the present invention will have more favorable load distribution as well as shock absorption properties. Furthermore, the design of this wheel is more durable than previously proposed pneumatic wheels. Thus, the skater who uses this wheel will have a lighter weight wheel which gives a smooth ride when traveling over many different surfaces. When the road is rough the skater will have the enhanced shock absorption properties available from the pneumatic structures. But, that same skater can also take advantage of the faster ride typically associated with a hard, light weight, polyurethane wheel, such as that of the present invention. This wheel will be able to be used by the skater who desires a performance ride as well as the person who needs a wheel capable of a comfortable ride over a variety of road conditions.

One embodiment includes a tube and rods structure which are discrete formations divided by a septum which enables movement of pressurized air through the septum and between the structures. This design allows the bladder device to have indirect fluid communication between the chambers. Thus, the skater will have a light weight wheel which has evenly distributed pressurization. At the same time, the addition of the septum provides support to the bladder complex which permits manufacture of the complex with a greater variety of materials.

In another embodiment the tube and rod structure open directly to each other so that the bladder rods appear to form a pocket integral with the tube. Such a structure enables the bladder device to maintain even pressure throughout. When one area incurs a sharp thrust, the open spaces of the other chambers quickly compensate for any loss of pressure to one area of the device. This open structure is also easily manufactured and extremely cost effective.

The wheel of the present invention may be manufactured in part by blow molding the walls of the bladder device. The device will then undergo a post vulcanization process to bond to the tire body. The bladder device is thereafter mounted to the hub so that the opposite axial ends of the rods are nested in the respective window openings. This placement of the rods ends in the windows also helps to create a support network for the bladder device during the formation of the tire body. Liquid polyurethane is then poured into the mold to form the tire body which is configured to substantially encapsulate the tube and rod structure and which bonds to the bladder, hub and flanges.

Other features and advantages will become apparent from the following detailed description taken in conjunction with the accompanying drawings, which illustrate by way of example, the features of the invention.

BRIEF DESCRIPTION OF THE DRAWINGS

FIG. 1 is a perspective view of a pre-pressurized in-line roller skate wheel embodying the present invention;

FIG. 2 is a side view, in enlarged scale, of the wheel shown in FIG. 1;

FIG. 3 is an enlarged cross-sectional view taken along line 3—3 of FIG. 2;

FIG. 4 is a perspective view, in enlarged scale, of a hub incorporated in the skate wheel shown in FIG. 1;

FIG. 5 is a perspective view, in enlarged scale, a pre-pressurized bladder device included in the wheel shown in FIG. 1;

FIG. 6 is a perspective view, in enlarged scale, of a hub and bladder device incorporated in the skate wheel shown in FIG. 1;

DETAILED DESCRIPTION OF A PREFERRED EMBODIMENT

Figure 7:
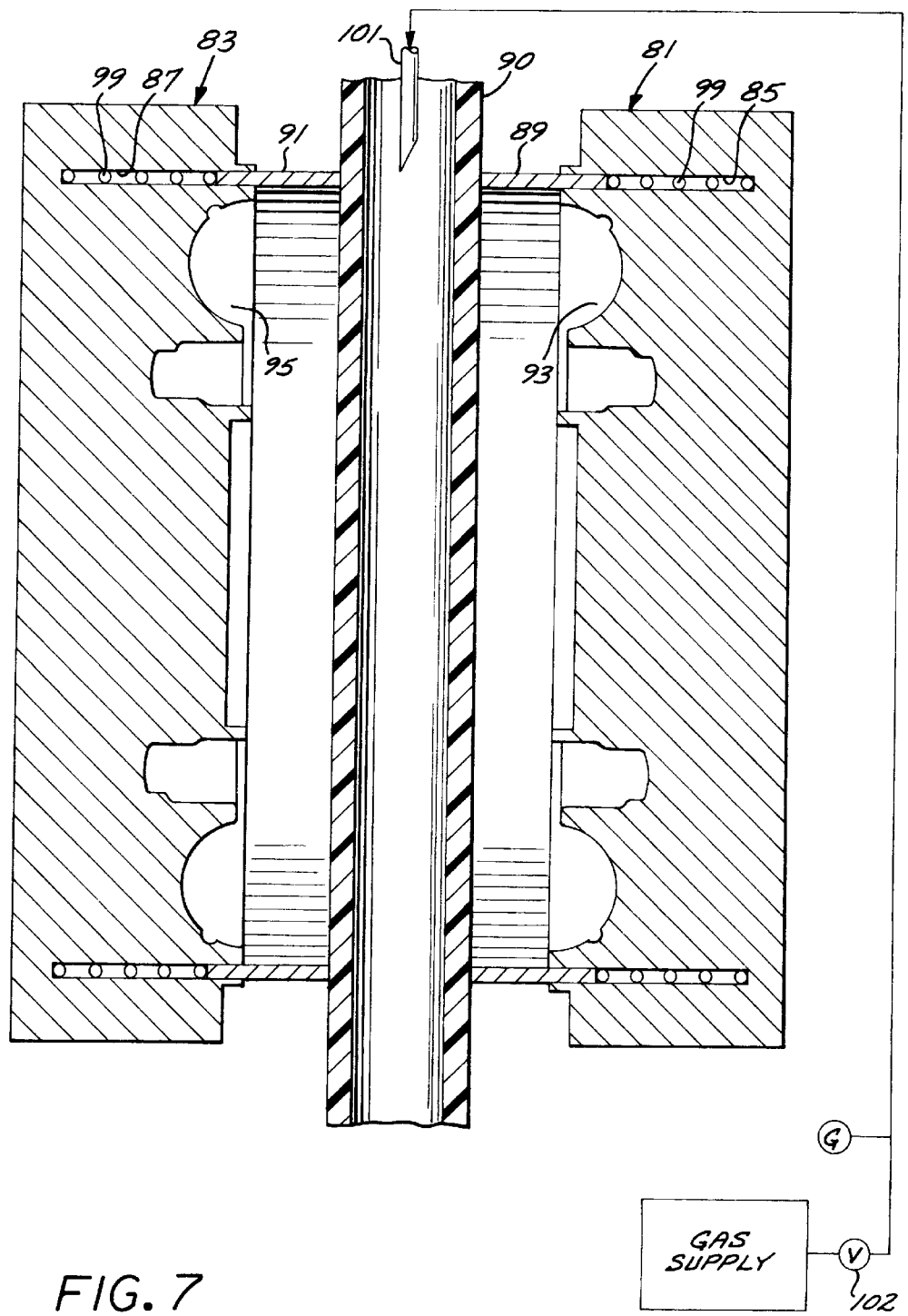
FIG. 7 is a cross-sectional view, in enlarged scale, nested in a mold during the manufacturing process.

The pre-pressurized in-line roller skate wheel of the present invention generally includes a rigid urethane hub 21 formed with a drop center 24 and having a pair of axially spaced apart flanges 25 and 27 which angle outwardly. The drop center 24 further defines three radially projecting spokes, generally designated 28. The flanges 25 and 27 are further formed with axially aligned and axially received through windows 29 and 31 spaced 120° apart and configured in a generally oval shape. A bladder device, generally designated 35 is constructed of a thermoplastic rubber and includes an annular tube 43 which surrounds three axially elongated bladder rods, generally designated 33, which are disposed concentrically about the tube 43. The rods 33 are spaced 120° apart and are formed at their axial ends to be received in the respective windows 29 and 31 of the flanges 25 and 27. Connecting the bladder rods to the tube are respective radial webs 41 which project outwardly from the bladder rods 33 and which mount at their radial outer extremities the annular tube 43. The tire body, generally designated 45, is formed to substantially surround the bladder device 35 and to bond to the drop center 24 and the bladder device 35. The tire 45 projects radially outwardly and is configured of a relatively soft polyurethane and having an arcuate peripheral tread surface 47.

In-line roller skating has developed into both a recreational sport and a professional industry. Professionals utilize in-line skates for sports such as roller hockey and "extreme" in-line skating which entails high speed turns, spins and jumps. Both of these sports require that the skater have the utmost control and maneuverability while skating, and both desire that the skate be as fast and light weight as possible. The recreational skater, on the other hand, typically uses in-line skates to conduct outings at the beach, or for exercise purposes, or maybe even to play some low impact street hockey. Typically these types of activities force the skater to encounter a variety of surfaces including asphalt, concrete, and sand, and as can be expected, these surfaces vary tremendously from the rough to the smooth. Furthermore, the recreational skater is subjected to vibrational forces when traveling across these surfaces which can cause discomfort or even injury to the legs, ankles or knees. Even on a very smooth surface, the recreational skater subjects his wheel to substantial shock loads and lateral torque when making quick turns and stops. It can therefore be seen that for the safety and comfort of the skater, these vibrations and forces need to be limited and absorbed as much as possible, and it is also important that the tire itself be able to withstand these very same forces.

The wheel is constructed using a thermoset polyurethane with the hub 21 being constructed of a rigid thermoplastic polyurethane. Typically the hub 21 should be of a hardness on the order of 75D durometer to provide excellent support to the tire body 45 as it experiences different loads and forces. The tire 45 is generally constructed of a relatively soft polyurethane having a durometer hardness of 80A while the bladder device 35 is also constructed of a soft thermoplastic rubber having a durometer on the order of 80A.

The hub 21 is constructed having an axial bore 51 therethrough which defines a pair of enlarged-in-diameter glands 53 at the opposite axial ends of the hub 21 for receipt of a pair of bearing casings (bearings not shown). The hub 21 is further formed with a pair of flanges 25, 27 which define at their radially outer extremities a respective pair of beads 55, 57 which cooperate to carry the various loads which are transmitted through the tire 45 and bladder device 35 to the axle of the hub. The hub 21 is defined by three spokes 28 which are spaced equidistant about the hub and which cooperate with the hub 21 and flange beads 55, 57 to carry the various loads. The drop center 24 is formed with an annular groove 59 centrally spaced and configured to define a space radially interior of the respective bladder rods 33.

The bladder device 35 (FIG. 5) may be constructed of a relatively soft thermoplastic rubber with the rods 33 being integrated in radially interior rods and formed having respective interior chambers 34 of a generally rectangular body 61. The rods 33 are formed with a reduced in diameter projection 64 at their respective opposite axial ends with are further formed with axially outwardly facing, inwardly angling shoulders 63. The shoulders are formed to complement the axially inner surfaces of the through windows 29, 31, and projecting axially therefrom are the reduced in diameter nubs 65 having a generally oval shape to be capable of being received inside the through windows 29, 31. Referring to FIG. 6, it can be seen that the respective shoulders 63 abut the interior edges of the respective through windows 29, 31 with the respective nubs 65. This close fit between the windows and the nubs cooperate to prevent the flow of liquid thermoset polyurethane out of the window during the molding process of the tire body 45.

The radial webs 41 are designed to stand the annular tube 43 off from the bladder rods 33. The webs 41 further act to maintain the spacing between the tube 43 and rods 33 as well as the spacing of the tube 43 radially from the drop center 24 and in a concentric configuration about the hub 21. The bladder device 35 is of integral construction to maintain the fluid within the structure and to prevent leakage when in use. The tube 43 is generally constructed having a circular cross section which creates a pressure chamber 46. Both the bladder rods 33 and tube 43 can be pressurized at low levels with a variety of fluids, including air.

Figure 15:
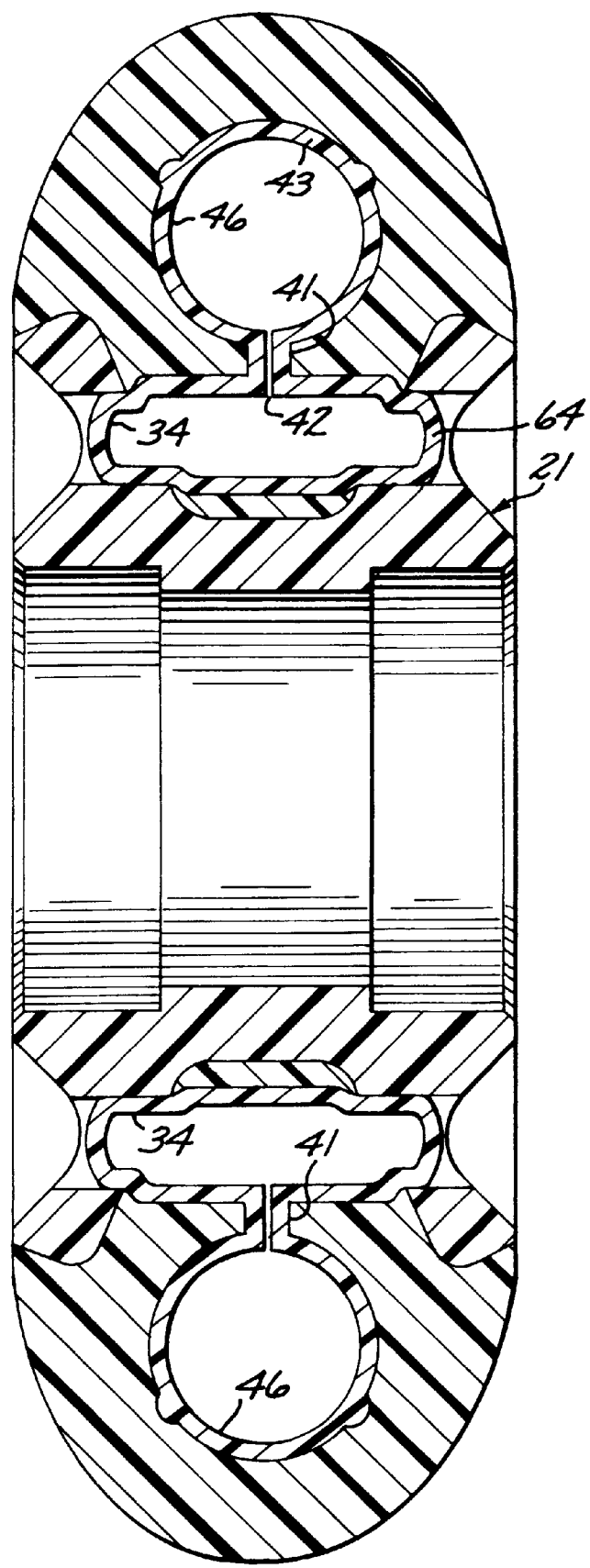
FIG. 15 is a cross sectional view, in enlarged scale, of an alternative embodiment of the skate wheel of the present invention.

It has been proposed that the radial web 41 may not be fully sealed therefore creating a division in the web 41 which forms a septum 42 as shown in FIG. 15. The septum 42 therefore allows for the some fluid movement between the tube 43 and the bladder rods 33. In this way, the air bladder rods 33 and tube 43 can cooperate in the distribution of fluid therebetween to provide a more efficient pressurization of the entire structure.

The tire body 45 is configured to be received within the drop center 24 and to project radially outward from the drop center along the flanges to terminate in an arcuate peripheral tread surface. Polyurethane having a durometer of generally 80A is used to form the tire body 45 which is further configured to substantially encase the bladder device 35 and bond to the spokes 28 of the hub 21 and the flanges 25, 27. In practice the polyurethane will flow about an encase the periphery of the bladder rods 33 so as to form within the annular groove 59 an endless constraining ring 73.

In-line skate wheels, generally, have an outside diameter of 7.5 cm although this may vary depending on the desired use of the wheel. The inside diameter of the hub 21, at the bearing glands 53, is approximately 2.2 cm. In one embodiment, the diameter of the hub 21 at the point of the drop center 24 is 3.7 cm. The diameter of the flanges 25, 27 as measured from the radial extremities is 4.7 cm and the flanges 25, 27 are axially spaced 2.5 cm apart. The annular tube 43 has an outside diameter of approximately 6 cm and an outside cross-sectional diameter of 1.2 cm with an exterior wall thickness of 0.1 cm. In the first embodiment the bladder rods 33 have an axial width of 1.5 cm and a radial height of approximately 1.3 cm. The radial thickness of the tire body 45 as measured from the drop center 24 is about 2 cm but can be of a variety of thicknesses depending on the desired degree of cushioning. Typically the wall of the tire body 45 as measured radially distal from the tube wall is 0.8 cm, which has been found to be sufficient to substantially surround the bladder device 35 and provide for shock absorption at the same time leaving adequate room for the tube 43 and bladder rods 33 to remain distended thus allowing the compressible gas to function to absorb shock and cushion the wheel, As can be seen in FIGS. 7–10, the bladder device can be open cast molded using complementary mold structures, generally designated 81 and 83, having confronting open ended, circular slide grooves 85 and 87 which are capable of telescopically receiving slide clamp rings 89, 91. The slide clamp rings 89, 91 are biased to respective open positions from the respective tops of the die bodies 81 and 83 by means of respective biasing springs 97 and 99 nested in the respective slide grooves 85, 87. The die bodies 81 and 83 are formed so their confronting sides include cavities which define the exterior routine of the bladder device. The mold cavities 93 and 95 may then be formed with the semi-cylindrical cavities configured to form the annular tube 43, and further including pairs of small dome like indentations disposed about the periphery of the cavity to form the wear bumps 44.

The molding process for the bladder device takes advantage of Boyle's Law [p≅1/v (where p=pressure, v=volume)] which dictates internal pressure within the bladder device.

A single walled tube strip of thermoplastic rubber material may be extruded to form a tubular blank 90 which is then advanced downwardly between the confronting edges of the retracted tubular clamps 89, 91 as shown in FIG. 7. A pressurized needle 101 may be advanced downwardly into place for initially blowing gas into the blank 90. In practice it has been found that a thermoplastic elastomer such as that sold under the name ALCRYN® 2080, manufactured by Dupont, is the preferred material for bladder construction due to its excellent blow molding capabilities and low cost.

Figure 8:
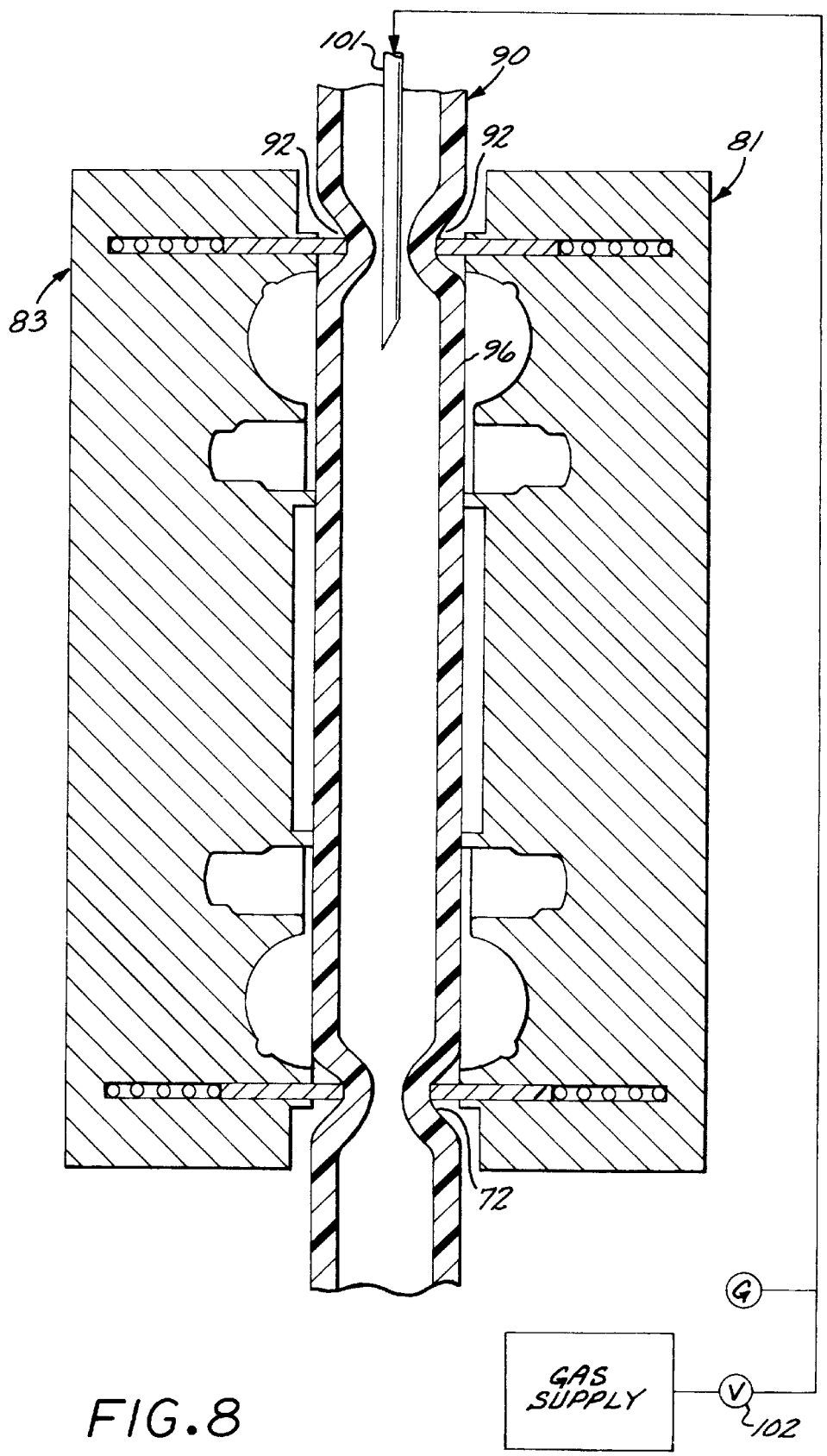
FIG. 8 is a cross-sectional view, similar to FIG. 7, after the introduction of urethane to form the tire body.

The die bodies 81, 83 may then be advanced to the position shown in FIG. 8 to engage the confronting edges of the tubular clamps 89, 91 with the opposite sides of the blank 90 to flex the opposite walls thereof inwardly toward one another to flatten the blank 90 somewhat to define a lateral dimension slightly greater than the major diameter of the cavities 93 and 95 (FIG. 9) to define creases 92 in the opposite walls, as shown in FIG. 8 to establish therebetween on the diametrically opposite sides of such clamps reduced-in-cross section tags 105 which restrict gas flow from the interior between such opposite clamps 89, 91.

Figure 9:
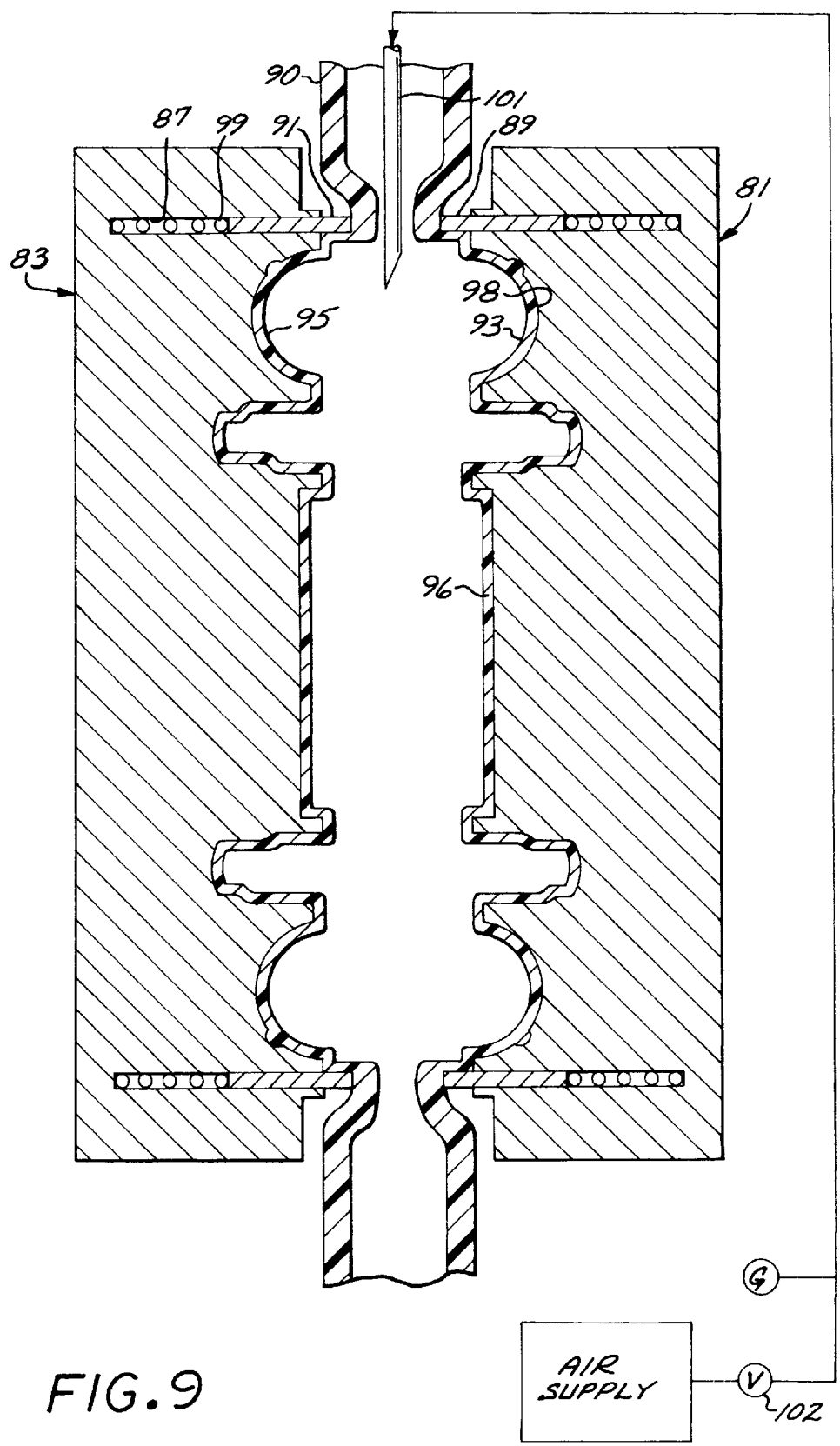
FIGS. 9–12 are angular cross-sectional views, in enlarged scale, taken through the cavities for the bladder in a blow mold for making the bladder device incorporated in the tire shown in FIGS. 1 and 3 and showing the mold in open, partially closed, initial pressurization and closed position, respectively.
Figure 10:
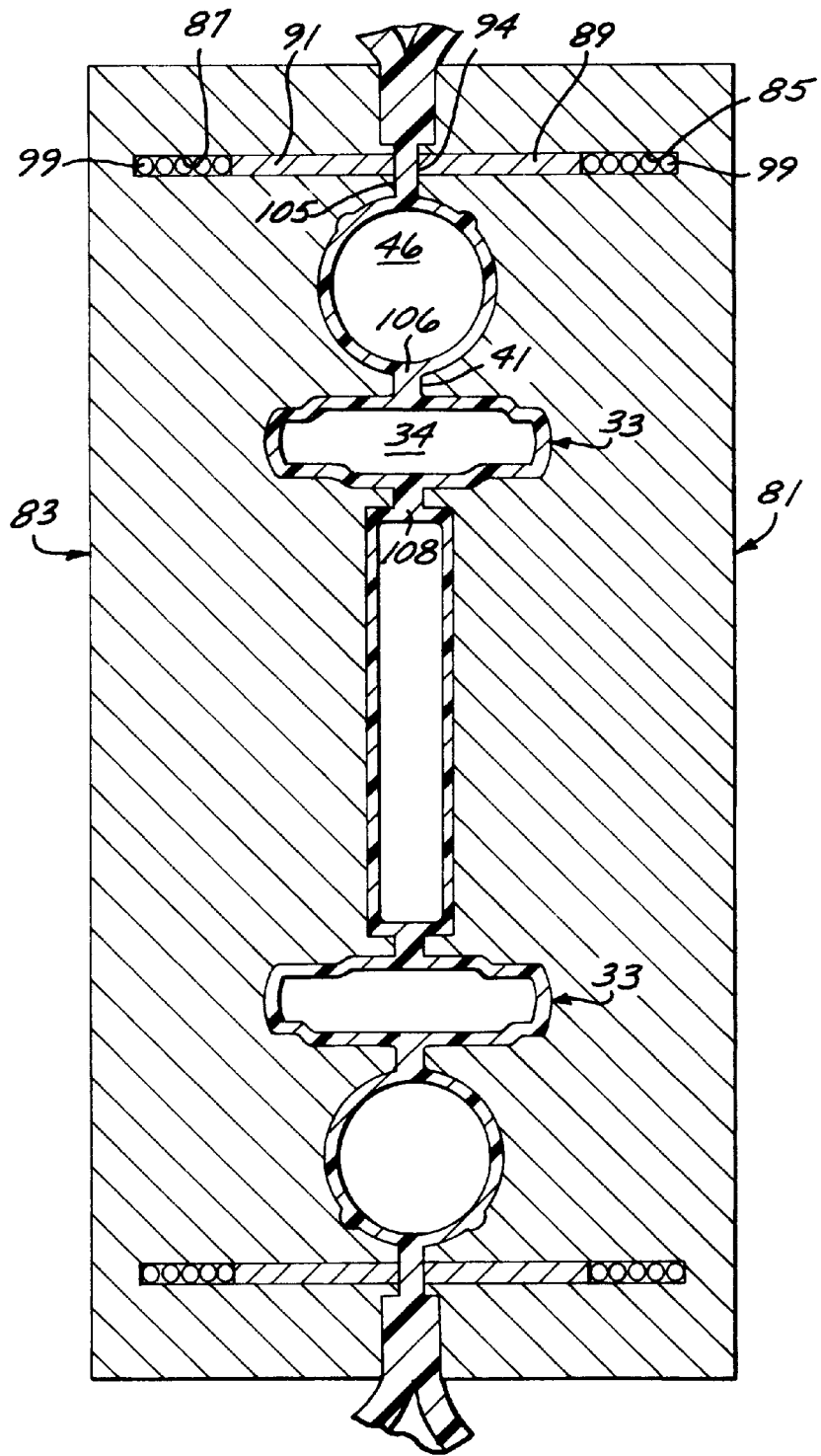
Figures 11, 12:
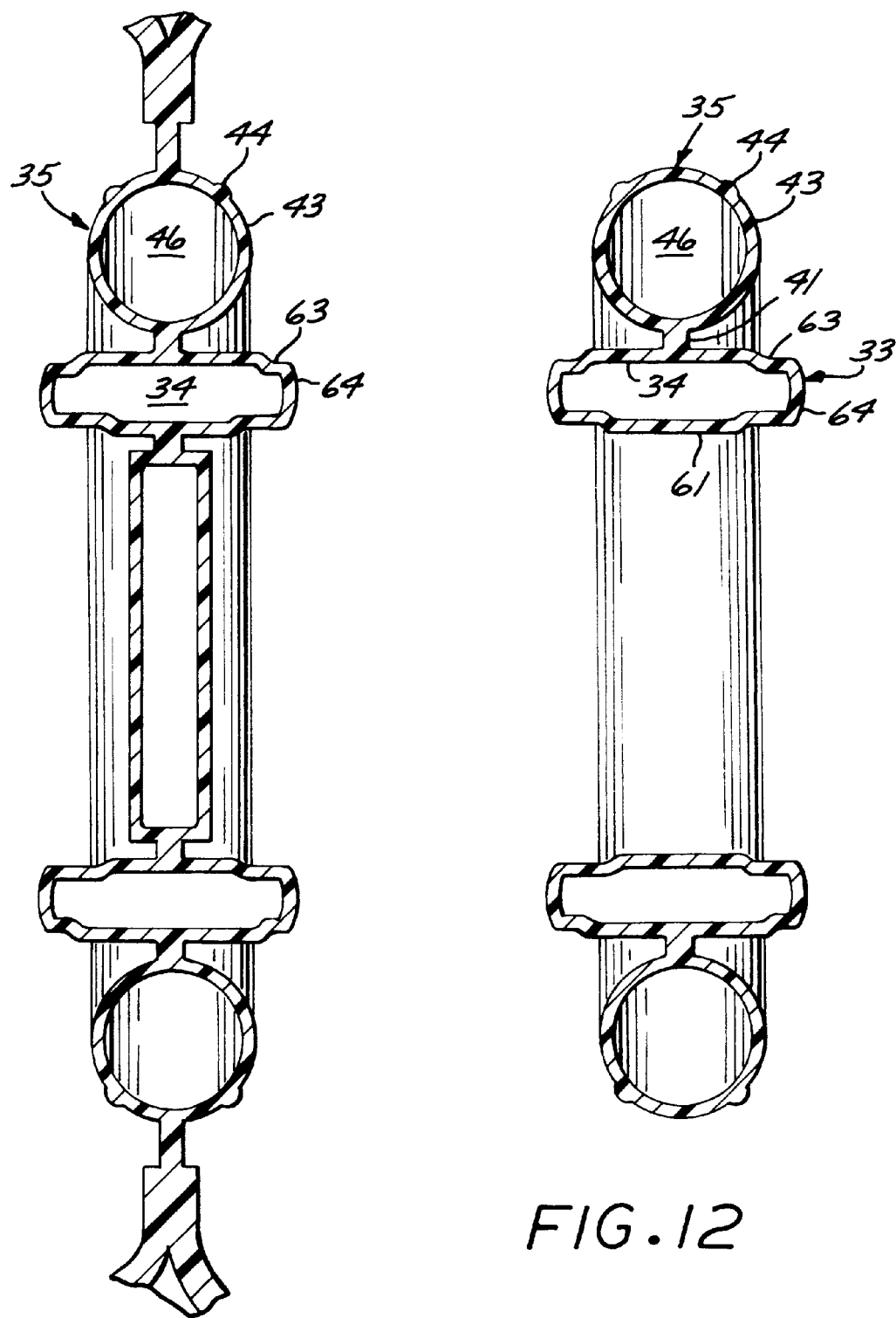

Using a control valve 102, gas may then be applied at a rate which allows for pressure to build up between the creases 92 to thus blow the wall of the blank 90 until it lines the contour of the mold cavities 93 and 95 and creates a liner wall 96 (FIG. 9). The needle 101 may then be removed and the mold halves 81 and 83 advanced until the crease 92 walls close on one another to form a peripheral seal 94 thus causing the gas within the confines of the liner wall 96 to be confined. The mold halves are then further advanced toward one another collapsing the spring clamps 89, 91 in their respective grooves to the position shown in FIG. 10, which seals the pressure chambers 46, 34 at the seam lines 106, 108 and captures the compressed gas. The polyurethane can then be allowed to cool to take the configuration of the bladder device as shown in FIG. 11. The cured bladder device 35 may then be removed from the mold and trimmed to remove the waste zones and provide the desired configuration (FIG. 12).

The mold and die blank 90 may be configured in a variety of configurations and the blank 90 may be pressurized to various pressurization levels, however, it is understood that the bladder device 35 should be pressurized to achieve the desired pneumatic support and shock absorption. When pressurizing the bladder device 35, one must not over pressurize, causing the formed bladder device (FIG. 12) to over extend and lose the appropriate shape. It has been found that a pressure between 0 and 5 psi is optimal and, in one embodiment, a pressure of 3 psi has been found satisfactory for the wheel of the subject invention. After the bladder device 35 has been cured, the device will be bathed in a solution of chlorine to therefore cause the bladder to bond to the tire body during casting. This post vulcanization process, utilizing a 10% solution of chlorine in water has been found to provide the best effect.

Figure 13:
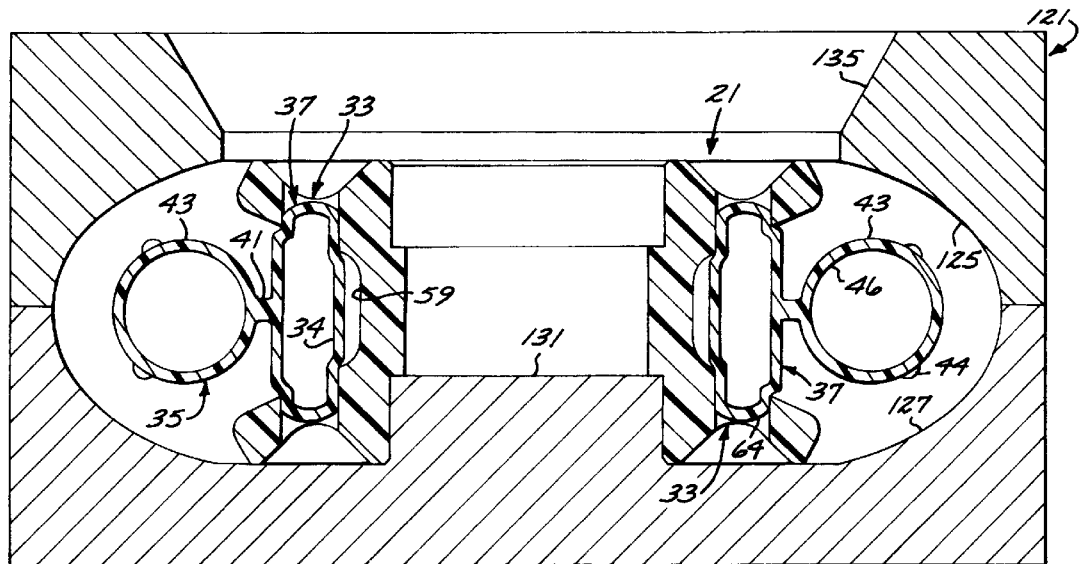
FIG. 13 is a sectional view of the bladder device contained in the mold shown in FIG. 12 but in its untrimmed state.
Figure 14:
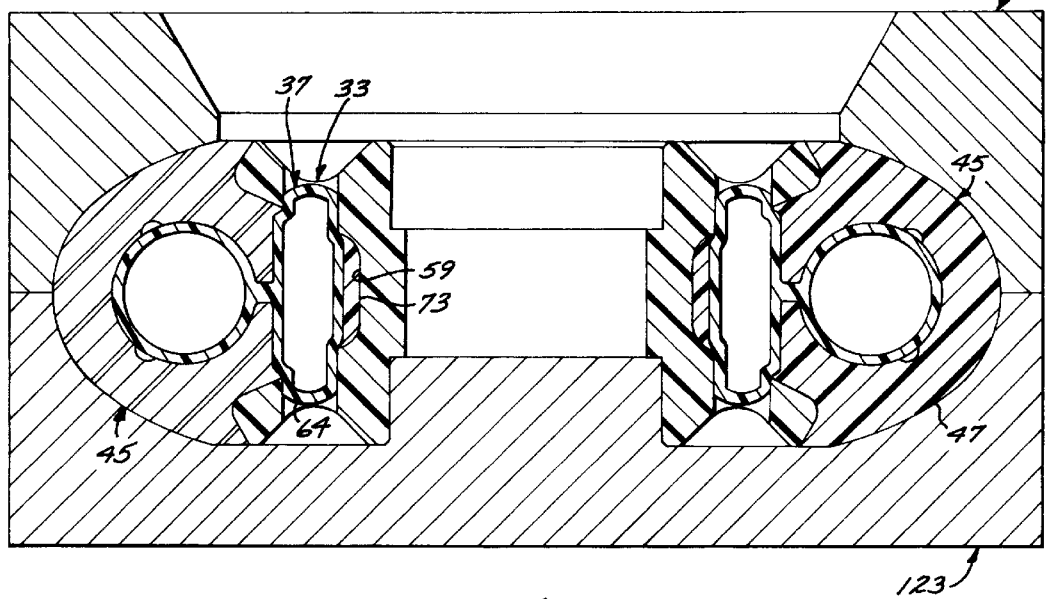
FIG. 14 is a cross-sectional view of the bladder device shown in FIG. 13 but after it has been trimmed.

An open cast mold has been found to be desirable for the tire itself, referring to FIGS. 13 and 14, and such a mold is made up of mold halves which are generally designated 121, 123. These mold halves 121, 123 have confronting ellipsoidal cavities 125, 127 respectively, which are configured to form the opposite complementary halves of the overall wheel configuration. The cavities 125, 127 and molding process for the wheel are similar to that shown in U.S. Pat. No. 5,630,891. The mold half 121 is formed with an upwardly opening frusto conical gate 135 and the lower half 123 with a central upstanding centering post 131 for nesting a bearing gland 53 of the hub 21.

In practice, a hub 21 and preformed bladder device 35 will be selected, the bladder device is then inserted into the hub 21 by manipulating the bladder rods 33 and tube 43 over one flange 25 or 27 so that it is nested in the drop center 24 and aligned with the respective flange windows 29 and 31. The bladder chambers 33 are manipulated into position such that the respective nubs 65 are received in the interior of the respective windows 29 and 31 and the respective shoulders 63 abut against the window edges, as shown in FIG. 3. Thus the respective bladder rods 33 will be aligned with the respective windows 29, 31 and the pressurized bladder rods 33 will cooperate with the hub 21 to hold the bladder device 35 securely in place with the annular tube 43 stood off from the drop center 24 for subsequent pouring of the tire body 45. It will be appreciated by those skilled in the art that the windows 29, 31 as in the preferred embodiment, are in the form of through openings in the respective flanges 25, 27 so that the opposite end walls of the nubs 65 may be viewed from the exterior of the wheel.

The hub 21 and assembled bladder device 35 are nested in the cavity 127 of the lower mold half 123 resting on the centering post 131 and the upper mold half 121 is closed thereon as shown in FIG. 13. Liquid polyurethane may then be introduced through the gate 135 to fill the combined cavities and to form the tire body 45 as shown FIG. 14. The tire body 45 will thereafter be configured with an elliptical tread surface 47 which extends about the periphery of the tire body 45 and will fully envelop the annular tube 43 and bond thereto. Similarly, the polyurethane will flow downwardly and radially inwardly relative to the respective bladder rods 33 to form between such bladder rods 33 annularly projecting polyurethane spokes and to further flow radially inwardly into the recessed groove 59 to thereby form a continuous annular constraining ring 73 extending entirely around the drop center radially interior of the respective outer bladder rods 33. The combined bladder device 35 is thus resistant to fluid leakage, due to its wall thickness and low pressure, and cooperates to form an overall load carrying and shock absorbing device characterized by the combined resiliency of the tire body 45 and the compressibility and flow characteristics of the fluid within the bladder device 35. Furthermore, the polyurethane defining the tire body 45 will flow about the contour of the respective flanges 25, 27 and over the flange beads 55, 57 to cooperate to form a high integrity bond which is resistant to high impact loads from numerous directions and which maintains a reliable load carrying structure.

It will be appreciated by those skilled in the art, that the fact that the bladder rod nubs 65 complementally fit the respective windows 29, 31 which thus block the flow of liquid polyurethane from flowing out the windows 29, 31 and thus allowing a high integrity bond to be established between the nubs, the shoulder 63 and the confronting peripheral edges of such windows (FIG. 3).

When a set of wheels of the present invention are mounted in line on the axles of a skate, the skater can roll on such wheels by centering his or her weight directly over the wheels, and may lean left or right to apply force to the wheels and thus maneuver with ease. A skater can thus traverse using long sweeping skate strokes or accomplish turns along a broad radii or sharp turns along a short radii, or even quick stops and jumps. As the skate rolls along the chosen surface, it will be appreciated that various different underlying irregularities, sharp ledges, cracks or gravel may be encountered and which will correspondingly apply shock loads to the wheel. Such shock loads may flex the tire radially inwardly as dictated by the resiliency of the tire body 45 and its ability to flex from the contact point. The force pattern set up in the tire will be dictated by the overall load on the tire and by the ability of the tire body 45 to flex tangential to the radial line between the axle and contact point. As the bladder rods 33 rotate around the wheel, the cavity defined by the respective chambers 34 will accommodate radial inward flexing of the tire body 45 to thus cooperate in absorbing the shock load. The bonding of the tire body to the drop flange as well as the encapsulation of the tube 43 and rods 33 facilitates the carrying of side loads and centrifugal forces.

It will be appreciated that should one or more of the bladder rods become punctured or otherwise lose their pressurization, the wheel performance will not be diminished. Since the bladder device 35 as shown in FIG. 3 is not in fluid communication throughout, leakage from one rod 33 will only slightly degrade the performance of the wheel because the other rods and the tube will not deflate. The wheel thus retains sufficient rigidity to enable the skater to make a return trip for repairs. Thus the skater has a reliable and durable wheel with a long use life.

Figure 16:
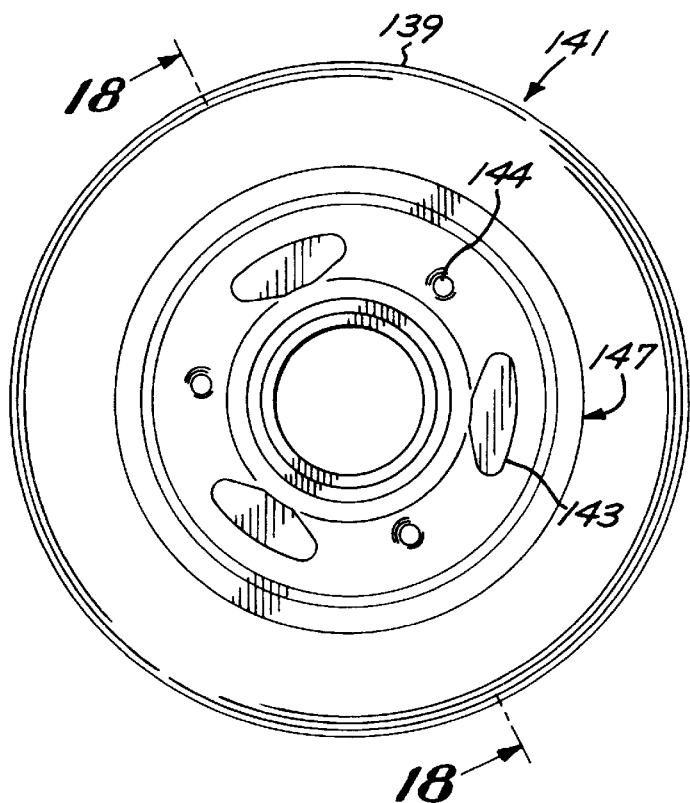
FIG. 16 is a side view, in enlarged scale, of a pre-pressurized in-line roller skate wheel of an alternative embodiment of the present invention.
Figure 21:
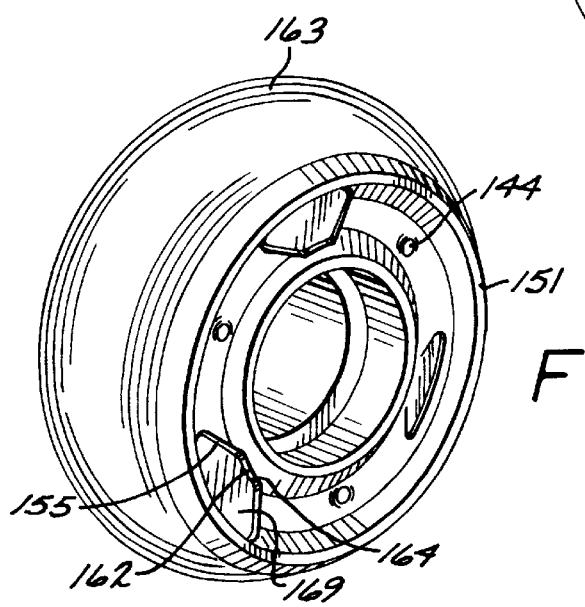
FIG. 21 is a perspective view, in enlarged scale, of a hub and bladder device incorporated in the skate wheel shown in FIG. 16.

Referring to FIGS. 16 and 21, a further embodiment of the pre-pressurized polyurethane wheel is constructed with the hub 147 being constructed of a rigid thermoplastic polyurethane of a hardness on the order of 75D durometer. Such a hub will fully support the tire body 145 as it rolls and experiences the consequential forces exerted thereon. The tire 145 is constructed of soft thermoset polyurethane typically having a durometer hardness of 80A. The bladder device, generally designated, 161 is constructed of a relatively soft thermoplastic rubber having a durometer on the order of 80A and configured with three radially inwardly disposed hollow rods 165.

Figure 17:
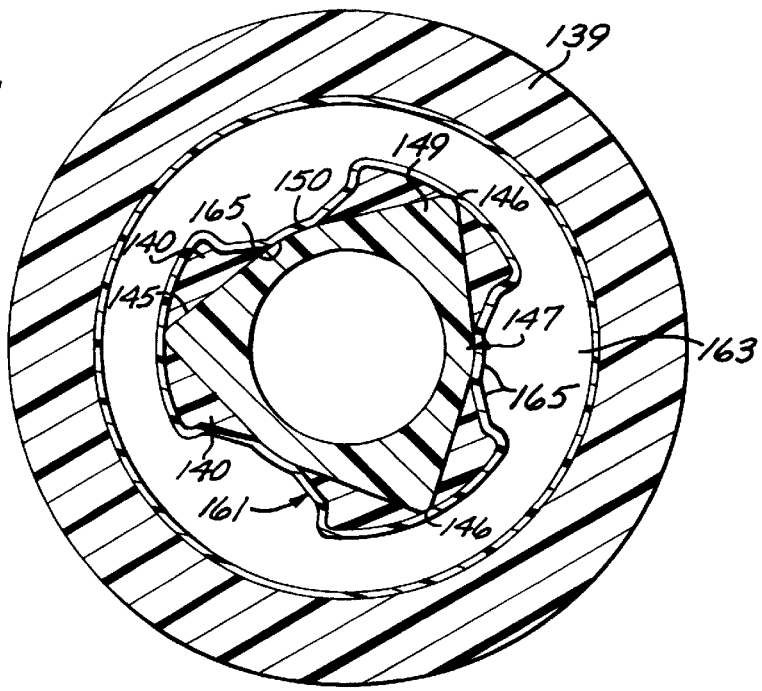
FIG. 17 is a cross sectional view, in enlarged scale, of the skate wheel shown in FIG. 16.
Figure 18:
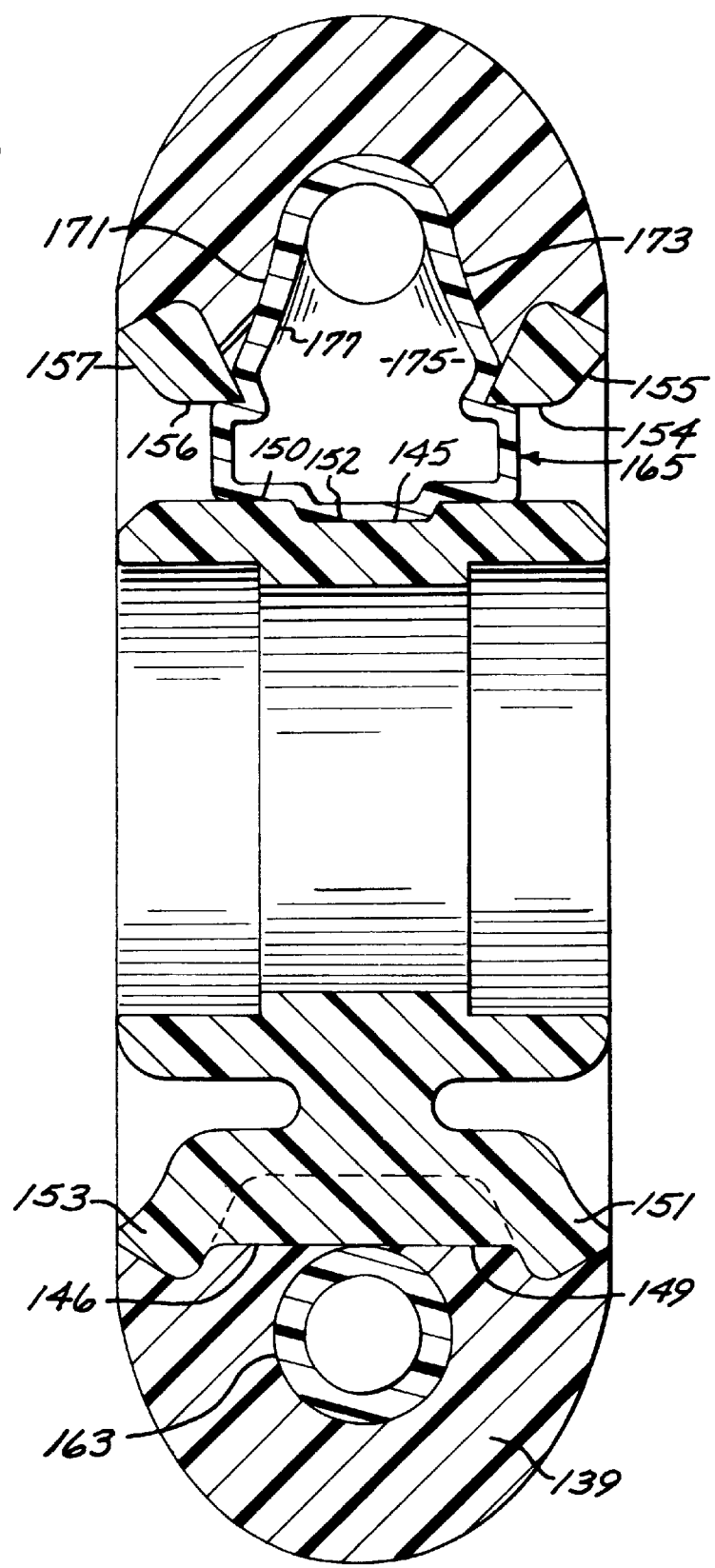
FIG. 18 is an enlarged cross-sectional view taken along line 18—18 of FIG. 16.
Figure 19:
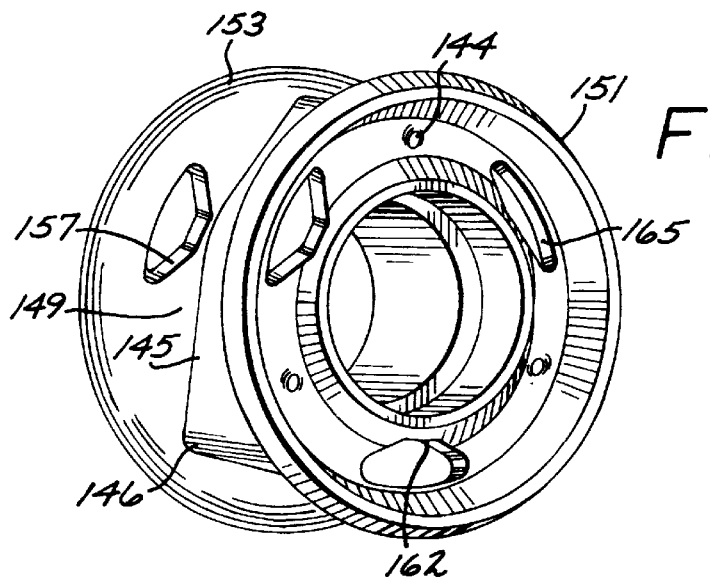
FIG. 19 is a perspective view, in enlarged scale, of a hub incorporated in the skate wheel shown in FIG. 16.

Referring to FIGS. 17, 18 and 19, this embodiment of the hollow core wheel, generally designated 141, generally includes a hard urethane hub 147 formed with a central core 149 having a predetermined width. Formed about the hub 147, and axially outwardly angled 26° from the transverse axis, are a pair of axially spaced radially projecting side flanges 151, 153. Referring to FIG. 17, the vertical cross section of such core is substantially triangular in form with the sides being equal in length and bowed outwardly in a radial direction and constructed around a central axle bore to define three radially extending spokes 145, spaced 120° apart and configured at their apexes with radially outwardly facing contact surfaces 146 which contact the radially inwardly facing surface of the bladder and serve to center such bladder about the bore and provide enhanced support to the flanges 151, 153 and tire body 139. The side defining the facets of such core between the apexes 146 are bowed radially outwardly to define radially outwardly facing medial support spacers 150 arranged in a circular pattern and on which the radial inner extent of the bladder 161 rests. The respective spacers 150 are configured with axially elongated contact surfaces formed in the axial centers with respective radially outwardly opening groove segments 152 (FIG. 18).

The side flanges 151 and 153 on the opposite sides of the core further define three axially aligned annular elongated indentations which form through openings. These openings form windows 155 and 157 spaced equidistant apart 120° and are configured on the radial outer extent with a generally oval shape and on their respective radial inner sides with truncated triangular shapes to form at the inner extremities respective radially outwardly facing spacer contact surfaces 162. The flanges 151, 153 are farther formed with three axially aligned pairs of axially outwardly opening cooling channels 144, which are small axially projecting notches spaced equidistant about the flanges interposed between the locations of the through windows 155, 157. These channels 144 assist in the manufacturing process by reducing the time necessary for cooling of the hub 147 during molding.

Figure 20:
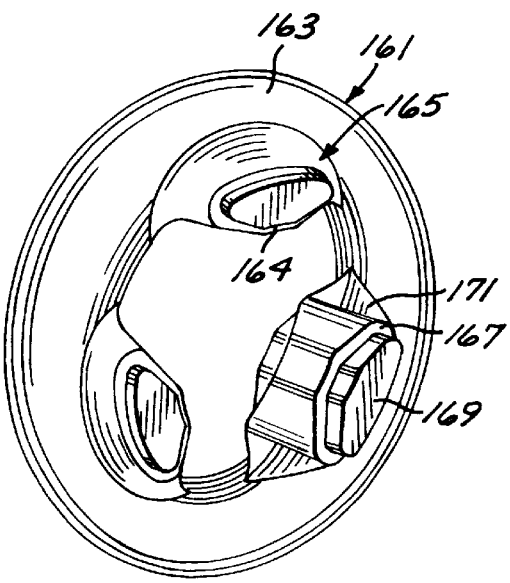
FIG. 20 is a perspective view, in enlarged scale, a pre-pressurized bladder device included in the wheel shown in FIG. 16.

Referring to FIGS. 18 and 20, the bladder device is formed from a thermoplastic rubber, as a unitary device which is self distending and relatively sturdy to form an open interior chamber 177. The device includes a generally toroidally shaped tube 163 which surrounds an integrates the three equally spaced spoke like bladder rods 165, disposed concentrically about the center of the tube 163. Typically, the tube 163 will have a cross sectional diameter slightly smaller than the axial width separating the flanges 151, 153 and is generally pressurized at low levels. The bladder rods 165 are spaced 120° apart about the tube 163 to complement the spacing of the core spacers 150 and generally define respective hollow chamber 175 (FIG. 18), which opens directly to the tube 163 to allow for direct fluid communication therebetween.

Referring to FIG. 20, the axial bladder rods 165 are formed by radially inwardly depending lobes or pods 171, 173 having axial opposite side walls which curve radially inwardly and axially outwardly to cooperate with a curved axial exterior bottom wall to form a stepped construction to complement the shape of the respective windows and define radially and inwardly angling sealing shoulders 167 (FIG. 20). The shoulders 167 are configured to complement the interior surface of the flanges 154, 156. The rods 165 are further formed with reduced in diameter axially elongated projections forming nubs 169 at their respective axial ends. These nubs 169 are formed with a generally oval shape at the radial exterior and a truncated triangular shape at the radial interior to snugly fit in the corresponding respective windows 155, 157 to define respective radially inwardly facing contact walls 164 to contact the respective outwardly facing spacer contact surfaces 162. This snug fit between the windows 155, 157 and nubs 169 also cooperates to prevent the flow of liquid urethane from leaking out of the windows 155, 157 when the tire 139 is poured. As shown in FIG. 18, the lobes, when installed, form respective ribs on their radially inner sides to nest in the respective groove segments 152 on the spacer surfaces 150.

It will be appreciated that the bladder must have sufficient strength and structural integrity to maintain such structure after casting of the urethane and still provide the necessary support to stand off the tube 163 from the drop center 149 and further to provide support to the tire body 139. The tube 163 and rods 165 are of integral construction to permit unimpeded fluid communication therebetween as well as to prevent fluid leakage during operation of the wheel 141. The tube 163 and rods 165 may be pre-pressurized with a variety of different fluids at a low pressure. In one embodiment the bladder rods 165 and tube 163 are pressurized with air.

Prior to molding, the bladder device is bathed in a 10% chloride and water solution for approximately five minutes. This post vulcanization process prepares the bladder device 161 for bonding to the tire body 139 during open cast molding. It has been found that Alcryn 2080 by Dupont is the most efficient material for manufacturing of the bladder device 161 due to its exceptional molding capabilities and the inexpensiveness of the materials.

The tire body 139 is configured to be received within the drop center 149 and to project radially outwardly therefrom and to terminate in an elliptical tread surface 138. The tire body 139 may be formed using a thermoset polyurethane having a durometer of generally 80A. The tire generally encapsulates the bladder device 161 by flowing about the rods 165 and axially through the axial spacer between the bladder and core to form axial bridge elements and to bond to the bladder device 161 and core. The tire body 139 further bonds to the spokes 145 and central 149 as well as the axial interior of the flanges. Thus the tire body, bladder device and hub form an integral unit.

In the embodiment shown in FIGS. 20 and 21, the annular tube 163 has an outside diameter of approximately 6 cm and an outside cross-sectional diameter of 1 cm. The bladder rods 165 have an axial width of about 1.5 cm and the open pocket structure 175 has a radial diameter of approximately 1.8 cm.

The wheel 141 can then be open cast molded by placing the pressurized bladder device 161 over one of the flanges and then securely positioning the device about the hub 147 surrounding the drop center 149. The bladder device 161 should be manipulated to such a degree that the rods 165 fit snugly within the windows 155, 157 and the sealing shoulder 167 will tightly abut the interior of the windows and complement the flange angle. It will be appreciated that the bladder rods 165 will be visible from the side of the wheel through the windows. The bladder and hub unit, as shown in FIG. 21, will thereafter be placed in the mold and positioned on the centering post. The bladder rods 165 cooperate with the tube 163 to maintain the position of the tube 163 during molding. The mold will then be closed and the liquid thermoset polyurethane will be poured therein. When the liquid polyurethane contacts the bladder device 161 an exothermic reaction occurs which immediately increases the pressure within the device and the hub, bladder, and tire body undergo a molecular bonding process which creates the integral unit which enables the wheel to withstand various and different loads exerted on it. When the newly cast wheel cools the pressure inside the bladder device decreases to a stable low pressure typically between 0 and 5 psi.

In operation, a set of wheels of the present invention will thereafter be mounted in tandem along the skate so that the skater may take advantage of the enhanced range of movement, maneuverability and light weight features now available. A skate which utilizes the wheels of the present invention is lighter weight due to the increased use of the bladder device and the decreased mass of the hub, as such the skater can glide along the road with less fatigue to the body and less chance of injury. The enhanced shock absorption of the pneumatic structure ensures that the skater will have a comfortable ride even when traveling over rocks, asphalt and the like due to its increased ability to flex under a variety of force loads and support the tire with little corresponding footprint. Furthermore, the pneumatic structure enables the tire body to be constructed of a harder polyurethane which provides a faster ride, yet still be shock absorptive and resilient. Thus the skater can obtain the positive aspects of both a hard wheel and a soft wheel without sacrificing any desired performance characteristics. Further, the open bladder structure quickly and most effectively accommodates any sudden pressure changes to the wheel by immediately transferring fluid between the affected bladder sections as necessary. This system best compensates for the radially inward flexing of the wheel which assists in absorbing shock. Furthermore, the integral bond formed between the tire body, hub and bladder further cooperates to carry the various loads applied to the wheel when in use.

From the foregoing, it will be clear that the skate wheel apparatus of the present invention provides a relatively smooth riding, highly durable wheel construction which provides the skater with advantages not available in other wheels and yet which is inexpensive to manufacture and correspondingly, to purchase. The construction of the wheel allows for an efficient manufacturing process using less expensive materials and which is convenient to use for a typical injection and molding plant. The end result is a high performance wheel that is particularly suited for durability and trouble free use.

What is claimed:

1. A urethane wheel comprising:
   a relatively rigid urethane hub formed with a core defining an axle bore and having axially spaced apart radially projecting flanges;

an integral bladder device including a tube formed with a tube chamber and disposed concentrically about said core and spaced therefrom to form a nesting space, said device further being formed with a plurality of rods in said nesting space spaced equidistant about said drop center and formed with respective rod chambers;

fluid in said tube and rod chambers; and a relatively soft molded urethane tire body formed between said flanges and surrounding a portion of said bladder device, bonded to said hub and bladder device and projecting radially outwardly from said bladder and configured with a peripheral tread surface.

2. A urethane wheel as set forth in claim 1, wherein:
said hub is further formed having a plurality of spacer spokes.

3. A urethane wheel as set forth in claim 2, wherein:
said spokes are spaced equidistant about said hub and contact a radially inner extent of said tube to maintain said tube in concentric alignment with said axle bore.

4. A urethane wheel as set forth in claim 1, wherein:
said rods project axially.

5. A urethane wheel as set forth in claim 1, wherein:
said flanges are formed with axially inwardly opening indentations; and
said rods are axially elongated to form axially opposite ends received in respective ones of said indentations.

6. A urethane wheel as set forth in claim 5, wherein:
said flanges are formed with said indentations projecting axially through to form windows.

7. A urethane wheel as set forth in claim 6, wherein:
said windows are spaced equidistant about said hub.

8. A urethane wheel as set forth in claim 6, wherein:
said chambers are formed at their respective said axially opposite ends with reduced in diameter projections which fit snugly into the respective said windows.

9. A urethane wheel as set forth in claim 1, wherein:
said bladder device is formed with an exterior wall being substantially 0.1 cm thick.

10. A urethane wheel as set forth in claim 1, wherein:
said bladder device is formed of a thermoplastic elastomer.

11. A urethane wheel as set forth in claim 1, wherein:
said fluid is compressible gas.

12. A urethane wheel as set forth in claim 11, wherein:
said compressible gas is pressurized.

13. A urethane wheel as set forth in claim 12, wherein:
said compressible gas is air.

14. A urethane wheel as set forth in claim 12, wherein:
said tube and chambers are pressured to 5 psi or less.

15. A urethane wheel as set forth in claim 12 wherein:
said tube and rod chambers are pressurized to substantially 3 psi.

16. A urethane wheel as set forth in claim 1, wherein:
said bladder device is formed with a plurality of wear bumps projecting from the exterior surface of said tube and spaced in annular relation about said tube.

17. A urethane wheel as set forth in claim 1, wherein:
said bladder device is formed so that said tube and said chambers are in direct fluid communication.

18. A urethane wheel as set forth in claim 1, wherein:
said tire body is constructed of thermoset urethane.

19. A urethane wheel as set forth in claim 1, wherein:
said tube and said chambers are constructed of thermoplastic rubber.

20. An in-line shock absorbing skate wheel comprising:

a hard urethane hub formed with a central core structure defining an axle bore and radially projecting spacer elements formed with annularly spaced radially outwardly facing contact surfaces;

a soft bladder device including an annular tube spaced concentrically around said bore and having a radially inwardly facing contact surface nesting against the respective said radially outwardly facing contact surfaces, said bladder device further including a plurality of axially elongated support lobes carried from a radial interior of said tube and cooperating with said core to form axial bridge spaces disposed radially inwardly of said tube; and a soft polyurethane tire body formed with axial bridge elements in said spaces, substantially encapsulating said bladder device and bonded thereto, said body being formed radially distally of said tube with an annular wall defining a polyurethane annular cushion configured with a rounded tread surface.

21. An in-line shock absorbing wheel according to claim 20 wherein:
said hub includes radial flange elements spaced axially apart to form therebetween a radially outwardly open annular groove; and
a portion of said bladder device is configured to nest in said groove.

22. An in-line shock absorbing skate wheel according to claim 21 wherein:
said spacer elements are in the form of radial spoke elements spaced equidistantly around said bore and configured with respective radial distal apexes arranged in a circular pattern and defining said contact surfaces.

23. An in-line shock absorbing skate wheel according to claim 21 wherein:
said hub includes radial flanges spaced axially apart and configured with said spacer elements defining said radially outwardly facing contact surfaces to contact said radially inwardly facing contact surfaces of said tube.

24. An in-line shock absorbing skate wheel according to claim 21 wherein:
said bladder device is pressurized with fluid.

25. An in-line shock absorbing skate wheel according to claim 21 wherein:
said bladder device is pressurized with compressible gas.

26. An in-line shock absorbing skate wheel according to claim 24 wherein:
said bladder is pressurized to less than 5 psi.

27. An in-line shock absorbing wheel according to claim 20 wherein:
said tube and lobes include chambers in fluid communication.

28. An in-line skate wheel comprising:
a urethane hard hub including a core element formed with an axle bore;
an inflated bladder device including an inflated tube element encircling said core element having radially outwardly facing contact surfaces;
said bladder device includes a plurality of axially elongated hollow lobe devices carried radially inwardly from said tube element and having a radially inwardly facing contact surface for contacting said core element to hold said tube element in concentric spaced relationship relative to said core element during manufacture to form an axial bridge space between said core element and said tube element; and a urethane tire body formed over and substantially encapsulating said tube to form axial bridge elements in said bridge space between said tube and core elements.

29. An in-line skate wheel according to claim 28 wherein:
said bladder device is formed with a chamber pressurized with fluid.

30. An in-line skate wheel according to claim 28 wherein:
said lobe devices are spaced equidistantly about said tube for contacting some of said radially outwardly facing contact surfaces.

31. An in-line skate wheel according to claim 30 wherein:
said hub includes flanges projecting radially outwardly from said core and formed with a plurality of windows that define some of said radially outwardly facing contact surfaces; and said lobe devices include respective axially projecting flexible rods formed on the respective opposite extremities with said radially inwardly facing contact surfaces contacting some of said radially outwardly facing contact surfaces.

32. An in-line skate wheel according to claim 31 wherein:
said rods are configured with fluid cavities pressurized with expandable gas.

33. An in-line skate wheel according to claim 28 wherein:
said tube is formed with a toroidally shaped compressible wall.

34. An in-line skate wheel comprising:

a urethane hub formed with a core configured with an axle bore and a plurality of radially outwardly projecting supports spaced annularly around said bore and formed with respective radially outwardly facing contact surfaces;

a bladder device including an annular tube concentric about said bore and including a plurality of hollow spacer elements so configured and arranged as to contact said contact surfaces to be held in spaced relation to said core during manufacture of said wheel;

a urethane tire body configured to substantially encapsulate said bladder and bond to said bladder and to said core; and wherein said tube and spacer elements are in fluid communication to cooperate in reducing vibrational forces transmitted through the wheel.

* * * * *